US012804633B2

(12) United States Patent
Taherzadeh Boroujeni et al.

(10) Patent No.: US 12,804,633 B2
(45) Date of Patent: Nov. 17, 2026

(54) DYNAMIC INDICATION OF SINGLE-TRANSPORT BLOCK (TB) TRANSMISSION VS MULTIPLE-TB REPETITION

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 473 days.

(21) Appl. No.: 17/575,382

(22) Filed: Jan. 13, 2022

(65) Prior Publication Data

US 2022/0272725 A1 Aug. 25, 2022

Related U.S. Application Data

(60) Provisional application No. 63/151,575, filed on Feb. 19, 2021.

(51) Int. Cl.
*H04W 72/1263* (2023.01)
*H04W 72/0446* (2023.01)
*H04W 72/23* (2023.01)

(52) U.S. Cl.
CPC ... *H04W 72/1263* (2013.01); *H04W 72/0446* (2013.01); *H04W 72/23* (2023.01)

(58) Field of Classification Search
CPC ............. H04W 72/1263; H04W 72/23; H04W 72/0446; H04W 72/04; H04W 4/06; H04W 52/0277; H04W 72/535; H04W 72/1268
USPC .......................................................... 370/329
See application file for complete search history.

(56) References Cited

U.S. PATENT DOCUMENTS

2017/0208575 A1* 7/2017 Chen ..................... H04L 5/0048
2019/0150164 A1* 5/2019 Nam ..................... H04L 1/1819
2019/0253229 A1* 8/2019 Hosseini ............... H04W 72/04
2020/0084759 A1* 3/2020 Liu ....................... H04L 1/1671
2020/0136770 A1* 4/2020 Khoshnevisan ...... H04L 5/0051
2020/0337074 A1* 10/2020 Papasakellariou ........................... H04W 72/1268
2021/0014791 A1* 1/2021 Freda ................ H04W 52/0277
2021/0084677 A1* 3/2021 Wänstedt ................ H04W 4/06
2021/0144743 A1* 5/2021 Rastegardoost ...... H04W 72/23
2021/0274536 A1* 9/2021 Shin .................... H04W 72/535
2021/0337428 A1* 10/2021 Li ..................... H04W 72/0446
2022/0045789 A1* 2/2022 Karmoose ............. H04L 1/0041
2022/0070911 A1* 3/2022 Baldemair ............ H04L 5/0094
(Continued)

FOREIGN PATENT DOCUMENTS

CN 113517948 A * 10/2021
WO WO 2018/031327 * 2/2018

*Primary Examiner* — Jungwon Chang
(74) *Attorney, Agent, or Firm* — Patterson + Sheridan LLP

(57) ABSTRACT

Certain aspects of the present disclosure provide techniques for configuring communication on a channel. One aspect provides a method for wireless communication by a user-equipment (UE). The method generally includes: receiving an indication of a channel configuration indicating whether transmission of a data channel uses a transport block (TB) on multiple segments of a data unit or the data channel is to be repeated on multiple TBs with each TB of the multiple TBs being on a respective one of the multiple segments; and communicating the data channel in accordance with the indication.

30 Claims, 11 Drawing Sheets

(56) References Cited

U.S. PATENT DOCUMENTS

| | | | | |
|---|---|---|---|---|
| 2022/0158715 | A1* | 5/2022 | Bishwarup | H04W 72/23 |
| 2022/0256511 | A1* | 8/2022 | Zewail | H04L 5/0094 |
| 2022/0272732 | A1* | 8/2022 | Sun | H04W 72/23 |
| 2022/0287069 | A1* | 9/2022 | Sengupta | H04L 1/1854 |
| 2022/0337374 | A1* | 10/2022 | Tiirola | H04W 72/23 |
| 2022/0408429 | A1* | 12/2022 | Choi | H04L 1/1812 |
| 2023/0048329 | A1* | 2/2023 | Kang | H04W 72/23 |
| 2024/0073873 | A1* | 2/2024 | Yao | H04W 72/0446 |

* cited by examiner

DYNAMIC INDICATION OF SINGLE-TRANSPORT BLOCK (TB) TRANSMISSION VS MULTIPLE-TB REPETITION

CROSS-REFERENCE TO RELATED APPLICATIONS

This application claims benefits of and priority to U.S. Provisional Patent Application No. 63/151,575, filed on Feb. 19, 2021, which is assigned to the assignee hereof and herein incorporated by reference in the entirety as if fully set forth below and for all applicable purposes.

INTRODUCTION

Aspects of the present disclosure relate to wireless communications, and more particularly, to techniques for channel transmission.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method for wireless communication by a user-equipment (UE). The method generally includes: receiving an indication of a channel configuration indicating whether transmission of a data channel uses a transport block (TB) on multiple segments of a data unit or the data channel is to be repeated on multiple TBs with each TB of the multiple TBs being on a respective one of the multiple segments; and communicating the data channel in accordance with the indication.

One aspect provides a method for wireless communication by a base station (BS). The method generally includes: transmitting an indication of a channel configuration indicating whether transmission of a data channel uses a TB on multiple segments of a data unit or the data channel is to be repeated on multiple TBs with each TB of the multiple TBs being on a respective one of the multiple segments; and communicating the data channel in accordance with the indication.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Channel coverage may be improved by repetition of a transport block (TB) over multiple slots (TBoMS). Another way to improve channel coverage may be to transmit one TB over time resources in multiple slots (also referred to herein as single-TB transmission). Repetition of a TBoMS may be easier to implement than transmitting one TB over time resources in multiple slots for transmission and reception. However, for some code rates, it may be better to combine the TBs and transmit one large TB over multiple slots. Without the ability to dynamically switch between using multi-TB repetition and single-TB, transmission may result in inefficient data communication. Aspects of the present disclosure provide techniques for dynamically switching between the multi-TB repetition and single-TB transmission.

According to aspects of the present disclosure, the dynamic switching may improve channel coverage using either the relatively more simple implementation of multi- TB repetition or a single TB transmission to support specific code rates. For example, a UE may be dynamically indicated (e.g., via downlink control information (DCI)) whether channel transmission over multiple slots (or multiple segments) is to use multiple TBs, one on each slot (or segment), or one TB over multiple slots (or multiple segments).

In various examples, the channel transmission may be a transmission of a physical uplink shared channel (PUSCH) or a physical downlink shared channel (PDSCH), though others are possible. In some cases, the channel transmission over multiple slots or segments using multiple TBs may include repeating the channel in each of the multiple TBs. For example, each repetition may include a different redundancy version (RV) of the channel's data. That is, the same data may be encoded differently for the repetitions using different redundancy versions.

Therefore, repetition of a TBoMS and transmitting one TB over time resources in multiple slots may both improve transmission performance. Because each may have advantages in specific circumstances, dynamically switching between the two is desired. Aspects of the present disclosure thus provide techniques for efficiently using both the multi-TB repetition and single-TB transmission.

Introduction to Wireless Communication Networks

Figure 1:
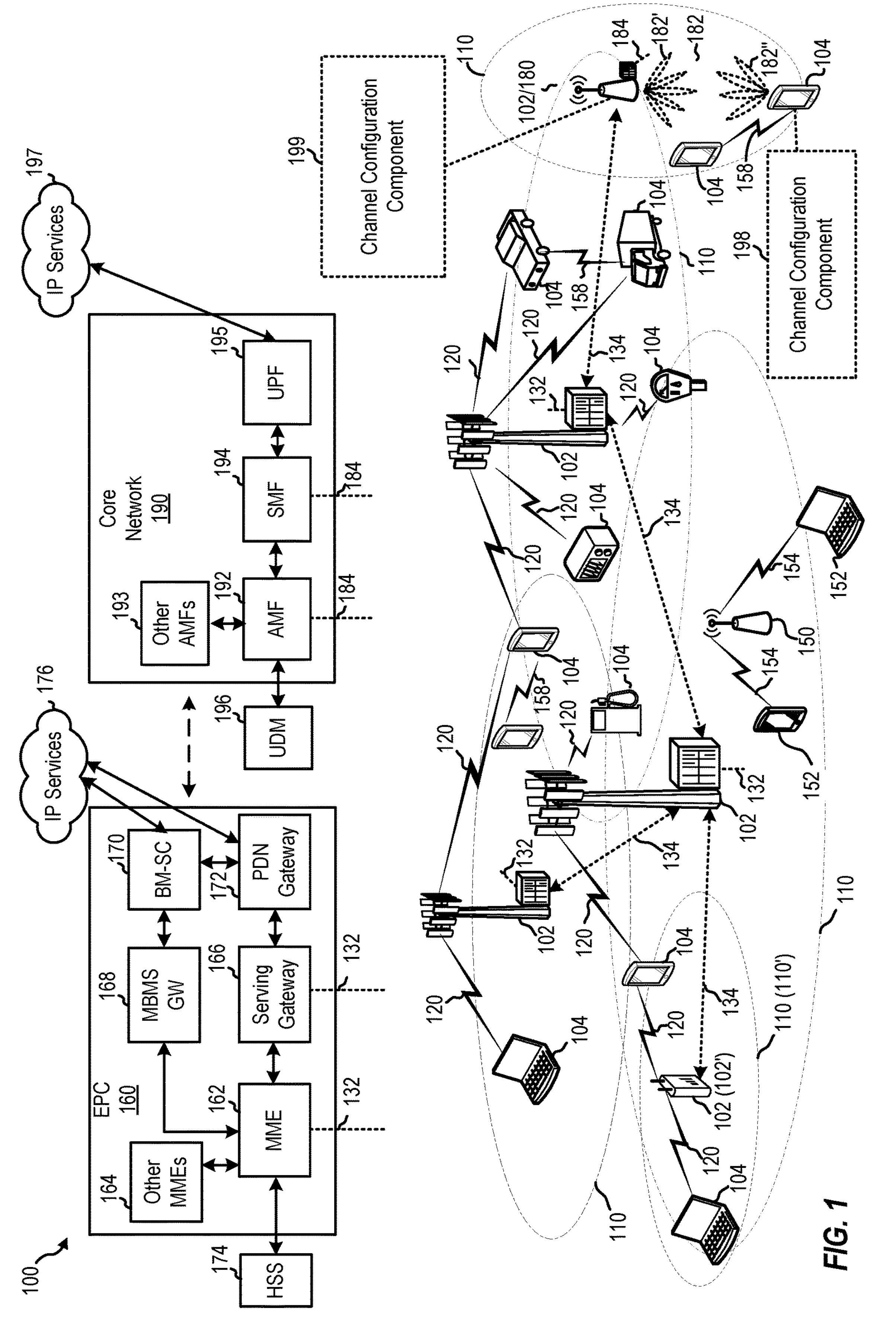
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes channel configuration component 199, which may be configured to transmit an indication of a channel configuration indicating whether transmission of a data channel uses a transport block (TB) on multiple segments (or slots) of a data unit or the data channel is to be repeated on multiple TBs with each of the multiple TBs being on one of the multiple segments (or slots). Wireless network 100 further includes a channel configuration component 198, which may be used configured to receive an indication of a channel configuration indicating whether transmission of a data channel uses a transport block (TB) on multiple segments (or slots) of a data unit or the data channel is to be repeated on multiple TBs with each of the multiple TBs being on one of the multiple segments (or slots).

Figure 2:
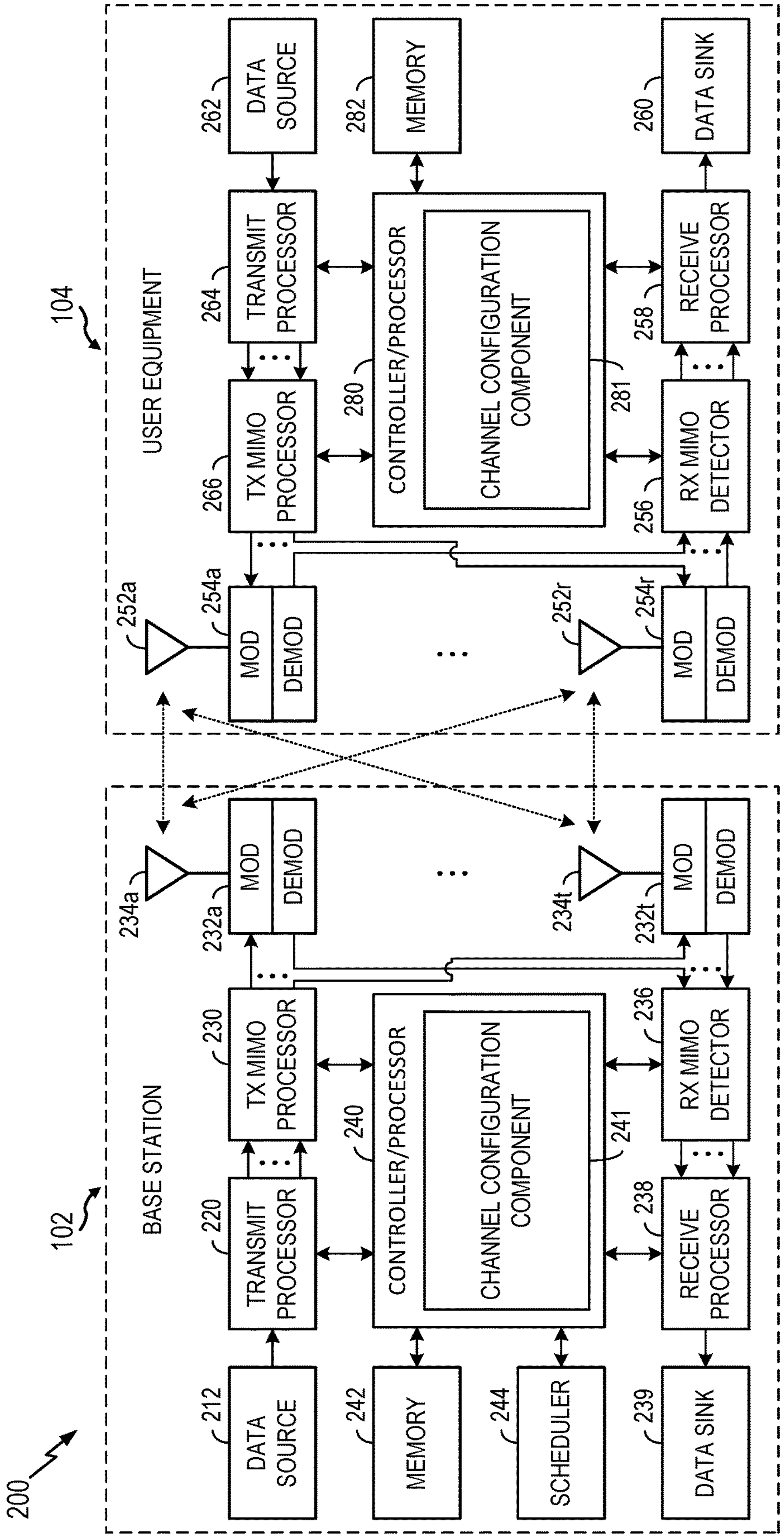
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes a channel configuration component 241, which may be representative of the channel configuration component 199 of FIG. 1. Notably, while depicted as an aspect of controller/processor 240, channel configuration component 241 may be implemented additionally or alternatively in various other aspects of BS 102 in other implementations.

Generally, UE 104 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes channel configuration component 281, which may be representative of channel configuration component 198 of FIG. 1. Notably, while depicted as an aspect of controller/processor 280, channel configuration component 281 may be implemented additionally or alternatively in various other aspects of UE 104 in other implementations.

Figures 3A, 3B, 3C, 3D:
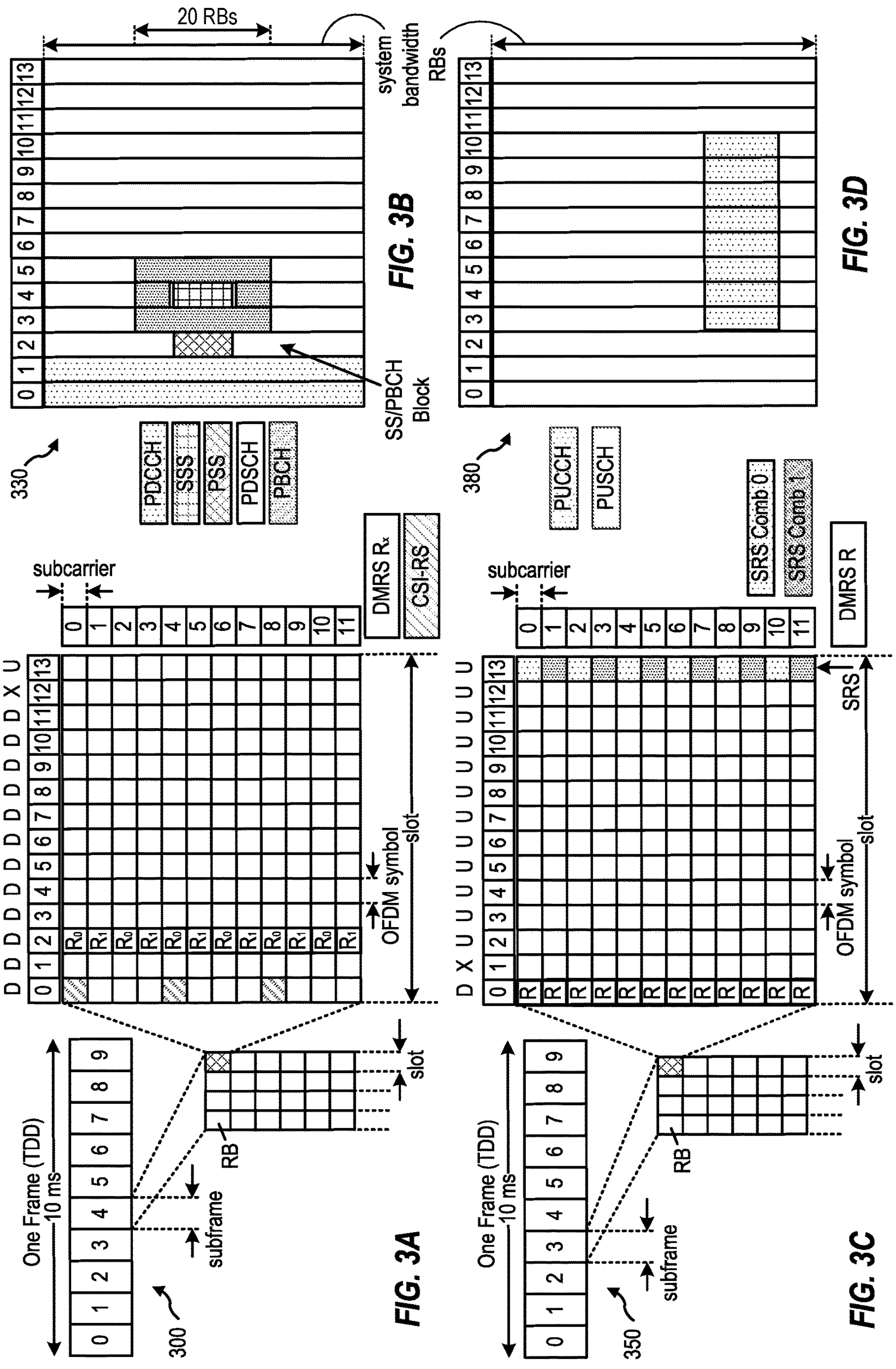
FIGS. 3A, 3B, 3C, and 3D depict various example aspects of data structures for a wireless communication network.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Aspects Related to Channel Transmission

Repetition of a transport block (TB) over multiple slots is a way to improve data transmission coverage. As used herein, the data transmission may refer to the transmission of a data channel, such as a physical downlink shared channel (PDSCH) or a physical uplink shared channel (PUSCH). In some configurations, one TB may be transmitted in one slot, wherein multiple copies (e.g., repetitions) of the TB are transmitted over multiple slots. The multiple copies of the TB may be transmitted using different redundancy versions (RVs).

In some aspects, performance may be improved by transmitting one TB over time resources in multiple slots. In other words, a single TB may span across multiple slots, reducing the modulation and coding scheme (MCS) (e.g., code rate) associated with the TB. The reduced code rate results in increased reliability associated with data transmission. Repetition of multiple copies of PUSCH (or PDSCH) TB over multiple slots may be easier for transmission and reception. Channel coverage may be improved by repeating the same data (possibly with different RVs) in multiple TBs, allowing a receiver to combine the TBs for decoding of the data. To support some code rates, it may be preferred to transmit one large TB over multiple slots (e.g., a large TBoMS) instead of using multiple TBs with repetition. In other words, having a larger TB results in the code rate associated with the data transmission being reduced to increase channel coverage, but may be a more complex implementation than using multi-TB repetition. Certain aspects of the present disclosure are directed techniques for dynamically configuring a UE to use either single-TB transmission or multi-TB repetition.

As described herein, two types of PUSCH repetitions may be referred to as PUSCH repetition type A and PUSCH repetition type B. An example of PUSCH repetition type A is discussed with respect to FIG. 4A, and an example of PUSCH repetition type A is discussed with respect to FIG. 4B. Some aspects of the present disclosure are directed to dynamically indicating whether a data channel is to be transmitted using multi-TB repetition, which may include either repetition type A or repetition type B.

Both PUSCH repetition types may be applicable to dynamic grant (DG) and configured grant (CG). A dynamic grant generally refers to a grant of PUSCH resources (or PDSCH resources) using dynamic indication, such as downlink control information (DCI). A CG generally refers to a persistent resource allocation (e.g., via radio resource control (RRC) signaling) for a PUSCH. Semi-persistent scheduling (SPS) generally refers to a persistent resource allocation (e.g., via RRC signaling) for a PDSCH.

Figure 4A:
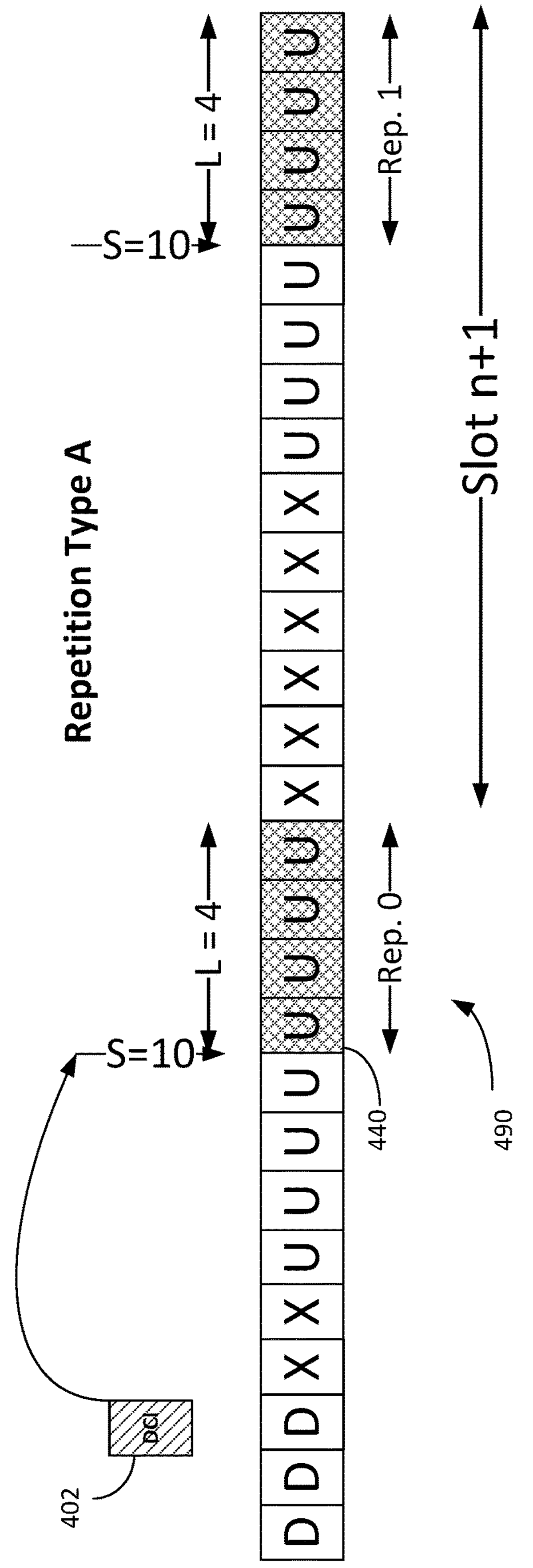
FIGS. 4A and 4B illustrate example channel repetition types.

FIG. 4A illustrates an example of PUSCH repetition type A. The slots shown in FIG. 4A may be either configured for downlink (labeled "D"), configured for uplink (labeled "U"), or configured as a special slot (labeled "X") which can be either designated as downlink or uplink. In some cases, a BS may indicate a number of repetitions K to a UE to be applied for PUSCH (or PDSCH). If the number of repetitions K is greater than 1, the same start and length indicator (indicated by a start and length indicator value (SLIV)) may be applied across K consecutive slots. SLIV indicates the start symbol and length of PUSCH. For example, DCI 402 may indicate SLIV for PUSCH transmission 490, such as a start symbol 440 S 10 with a length L of 4 symbols, as in FIG. 4A. As shown, the PUSCH may be transmitted based on the SLIV in each of the K consecutive slots. For example, repetition 0 of PUSCH may be transmitted in a segment of slot n, as shown, and repetition 0 of PUSCH may be transmitted in a segment of slot n+1, as shown. As used herein, a segment generally refers to a group of consecutive uplink configured symbols or a group of consecutive downlink configured symbols, as shown in FIG. 4A and FIG. 4B.

Figure 4B:
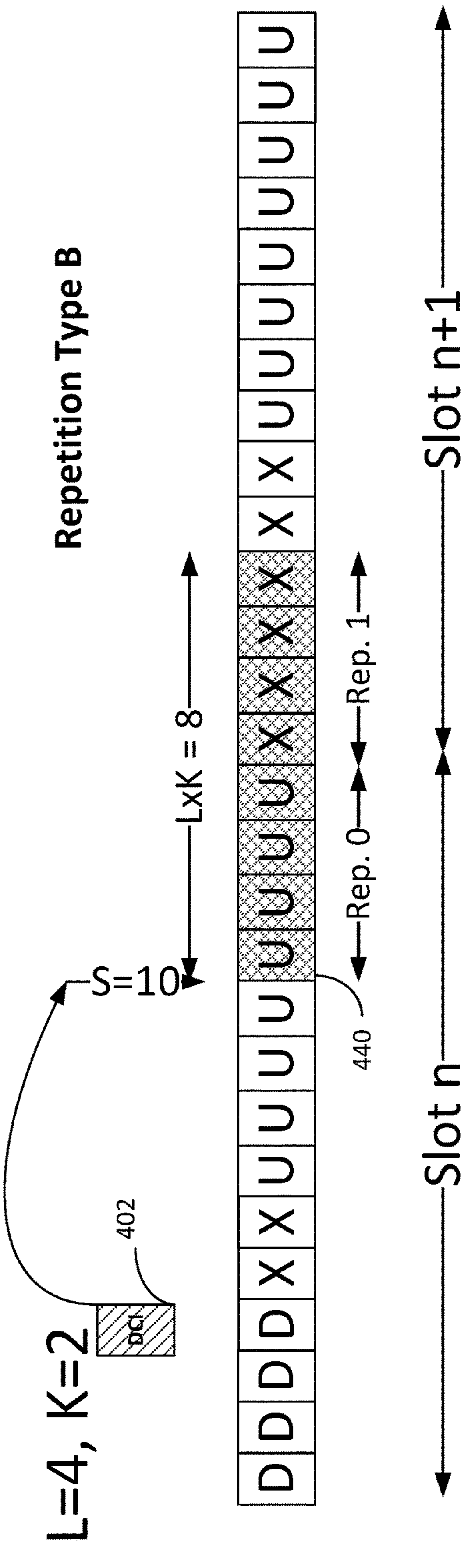

FIG. 4B illustrates an example of PUSCH repetition type B. The slots shown in FIG. 4B may be either configured for downlink (labeled "D"), configured for uplink (labeled "U"), or configured as a special slot (labeled "X") which can be either designated as downlink or uplink. As shown, the repetitions of PUSCH may be within or across slots. For example, the PUSCH may cross a slot boundary, such as the boundary between slot n and n+1 shown in FIG. 4B.

In some aspects, dynamic indication of a number of repetitions may be implemented. That is, DCI 402 may indicate SLIV for the PUSCH repetitions. For example, a start at symbol (S 10) may be indicated with K=2 repetitions, as shown. More generally, DCI 402 may indicate that K nominal repetitions, each with nominal length L, may be sent back-to back starting from symbol 440 (S 10), where S and L are given by SLIV. In other words, repetition 0 may be transmitted in a segment of slot n and repetition 1 may be transmitted in a segment of slot n+1, where the segments are contiguous. The aspects described herein may be implemented using inter-nominal PUSCH frequency hopping. Moreover, while FIGS. 4A and 4B have illustrated an example uplink/downlink (U/D) symbol interaction and SLIV configuration to facilitate understanding, any U/D symbol interaction or SLIV configuration may be used.

Figure 5A:
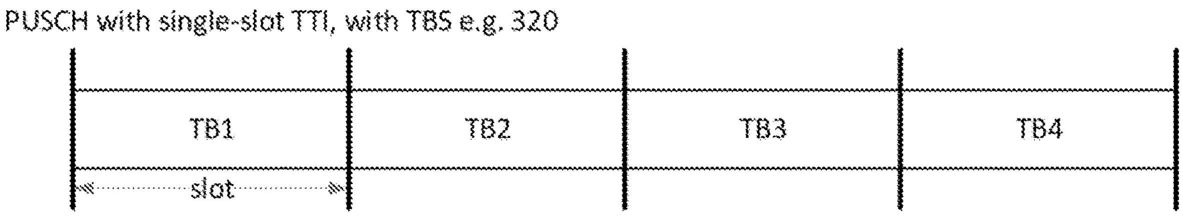
FIGS. 5A and 5B illustrate example techniques for channel transmission using one or more transport blocks (TBs).
Figure 5B:
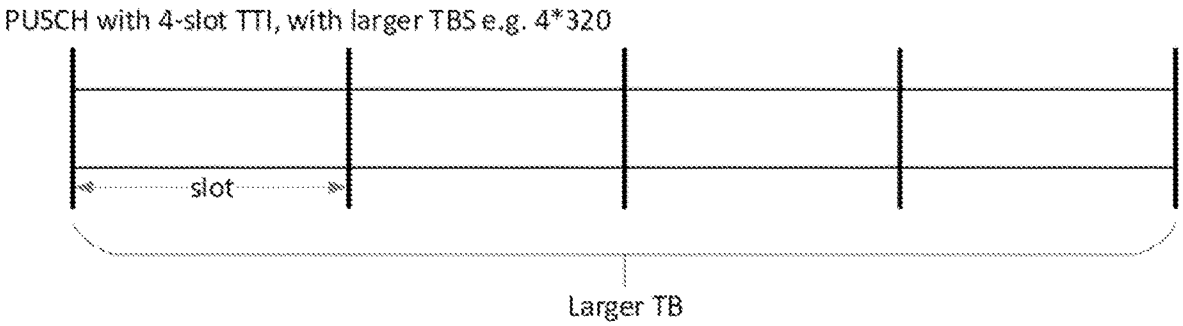

FIGS. 5A and 5B illustrate example techniques for PUSCH transmission. As shown, a PUSCH may be transmitted using a single-slot transmission time interval (TTI) or using a four-slot TTI. For example, as shown in FIG. 5A, a repetition of PUSCH may be transmitted in each of transport block (TB) 1, TB 2, TB 3, and TB4 for the single-slot TTI implementation. For the four-slot TTI implementation, a larger TB may be transmitted on four slots, as shown in FIG. 5B. For example, the transport block size (TBS) for the four-slot TTI implementation may be four times the TBS for the single-slot TTI implementation.

Some aspects of the present disclosure are generally directed to a BS dynamically indicating whether data channel transmission over multiple slots (or multiple segments) is to use multiple TBs (e.g., repetitions of a TB, with possibly different RVs), one on each slot or segment, or using one TB over multiple slots or segments. The multiple segments may be contiguous segments that span across a slot boundary, may be segments within a slot, or may be non-contiguous segments that are in different slots.

Figure 6:
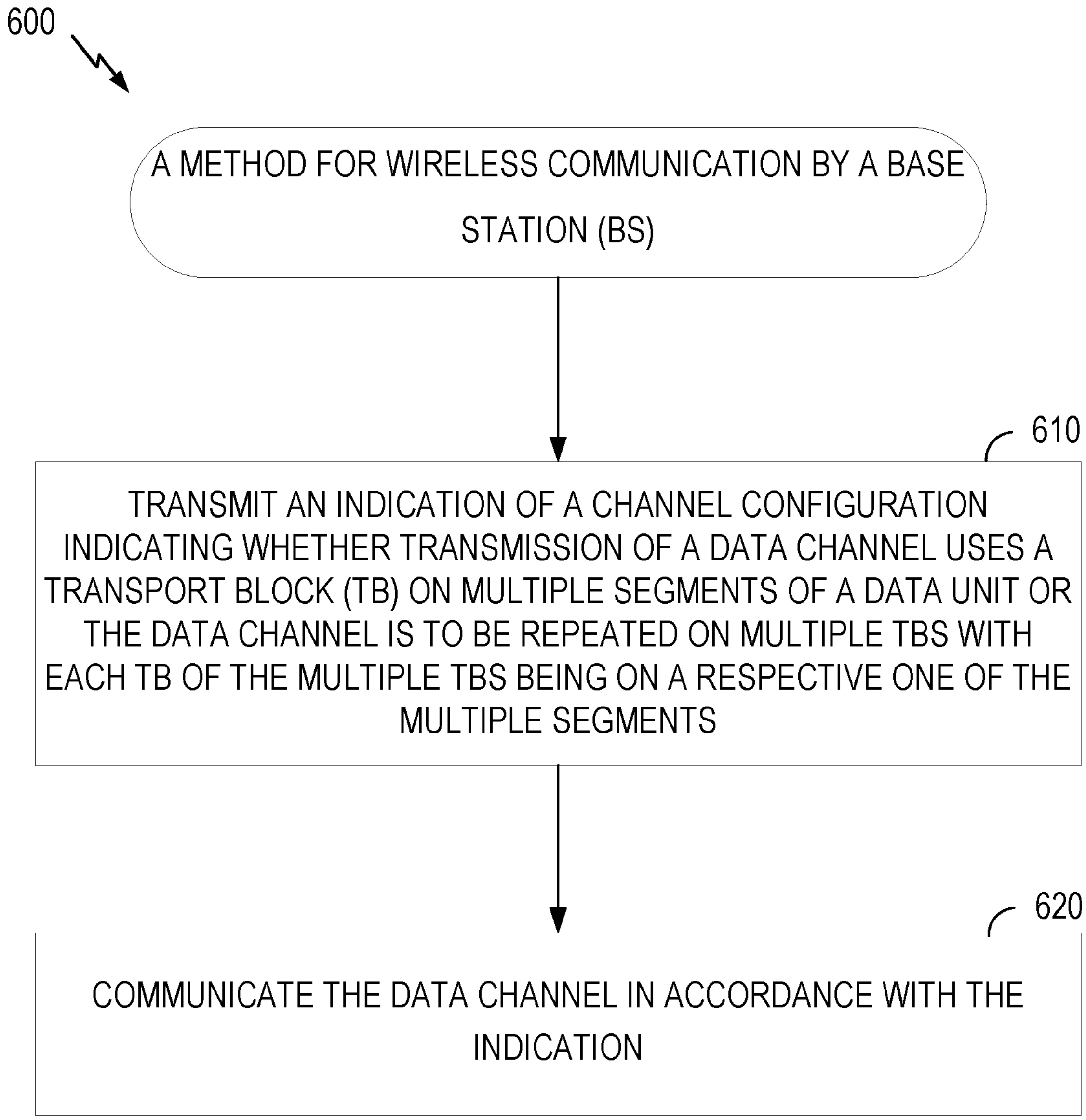
FIG. 6 is a flow diagram illustrating example operations for wireless communication, in accordance with certain aspects of the present disclosure.

FIG. 6 is a flow diagram illustrating example operations 600 for wireless communication. The operations 600 may be performed, for example, by a BS (e.g., such as the BS 102 in the wireless communication network 100 of FIG. 1).

Operations 600 may be implemented as software components that are executed and run on one or more processors (e.g., controller/processor 240 of FIG. 2). Further, the transmission and reception of signals by the BS in operations 600 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 600 may begin, at block 610, with the BS transmitting an indication of a channel configuration indicating whether transmission of a data channel uses a TB on multiple segments of a data unit (e.g. a protocol data unit (PDU)) or the data channel is to be repeated on multiple TBs with each TB of the multiple TBs being on a respective one of the multiple segments.

Each segment of the multiple segments may include one of a group of consecutive downlink configured symbols which may be used for a BS to transmit a PDSCH, or a group of consecutive uplink configured symbols which may be used by a UE to transmit a PUSCH. In some aspects, each of the multiple segments is in a different slot of the data unit. The multiple segments may be non-contiguous or contiguous segments. The contiguous segments may span across a slot boundary between adjacent slots, such as in the example described with respect to FIG. 4B.

In some aspects, the channel configuration indication may be part of DCI (e.g., DCI 402), including a group-common DCI, that schedules the data channel. A group-common DCI may be a DCI that provides control information for multiple UEs. The DCI may include a field configured to indicate a number of repetitions associated with the data channel transmission.

At block 620, the BS communicates the data channel in accordance with the indication. For example, the BS may receive the data channel if the data channel is a PUSCH or may transmit the data channel if the data channel is a PDSCH. In some aspects, the channel configuration may also be applied for another data channel configured using semi-persistent scheduling (SPS) or a configured grant (CG). For example, the UE may also determine, based on the indication of the channel configuration, whether transmission of another data channel (e.g., an SPS or CG data channel) uses another TB on multiple segments of another data unit or the other data channel is to be repeated on multiple other TBs with each TB of the multiple other TBs being on a respective one of the multiple segments of the other data unit.

Figure 7:
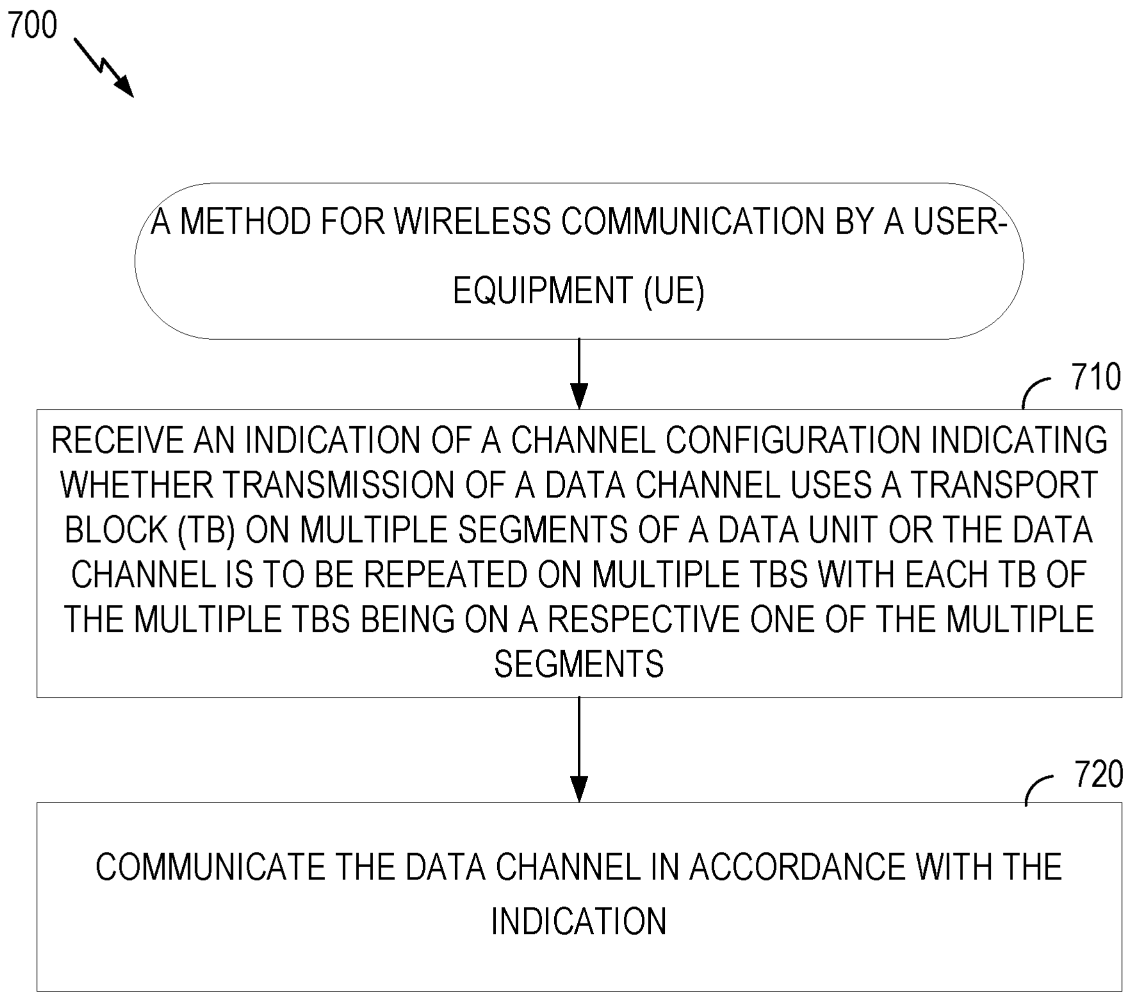
FIG. 7 is a flow diagram illustrating example operations for wireless communication, in accordance with certain aspects of the present disclosure.

FIG. 7 is a flow diagram illustrating example operations 700 for wireless communication, in accordance with certain aspects of the present disclosure. The operations 700 may be performed, for example, by a UE (e.g., such as a UE 104 in the wireless communication network 100 of FIG. 1).

The operations 700 may be complimentary operations by the UE to the operations 600 performed by the BS, as described with respect to FIG. 6. Operations 700 may be implemented as software components that are executed and run on one or more processors (e.g., controller/processor 280 of FIG. 2). Further, the transmission and reception of signals by the UE in operations 700 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 700 may begin, at block 710, with the UE receiving an indication of a channel configuration indicating whether communication of a data channel (e.g., PUSCH or PDSCH) uses a transport block (TB) on multiple segments of a data unit or the data channel is to be repeated on multiple TBs with each TB of the multiple TBs being on a respective one of the multiple segments. Each segment of the multiple segments may include one of a group of consecutive downlink configured symbols which may be used for a BS to transmit a PDSCH, or a group of consecutive uplink configured symbols which may be used by a UE to transmit a PUSCH. In some aspects, each of the multiple segments is in a different slot of the data unit. The multiple segments may be non-contiguous or contiguous segments. The contiguous segments may span across a slot boundary between adjacent slots, such as in the example described with respect to FIG. 4B.

In some aspects, the channel configuration indication may be part of DCI (e.g., DCI 402), including a group-common DCI, that schedules the data channel. A group-common DCI may be a DCI that provides control information for multiple UEs. The DCI may include a field configured to indicate a number of repetitions associated with the data channel transmission. In this case, the field may also include the indication of the channel configuration. For example, the DCI may include a time domain resource allocation (TDRA)

bitfield to indicate the transmission(s) of a TB over multiple slots (TBoMS) or one or more parameters related to the TBoMS, such as a selection between data channel repetitions and a TBoMS.

At block 720, the UE communicates the data channel in accordance with the indication. For example, the UE may transmit the data channel if the data channel is a PUSCH or may receive the data channel if the data channel is a PDSCH.

In some aspects, the channel configuration may also be applied for another data channel configured using SPS or a CG. For example, the UE may also determine, based on the indication of the channel configuration, whether transmission of another data channel uses another TB on multiple segments of another data unit or the other data channel is to be repeated on multiple other TBs with each TB of the multiple other TBs being on a respective one of the multiple segments of the other data unit.

Figure 8:
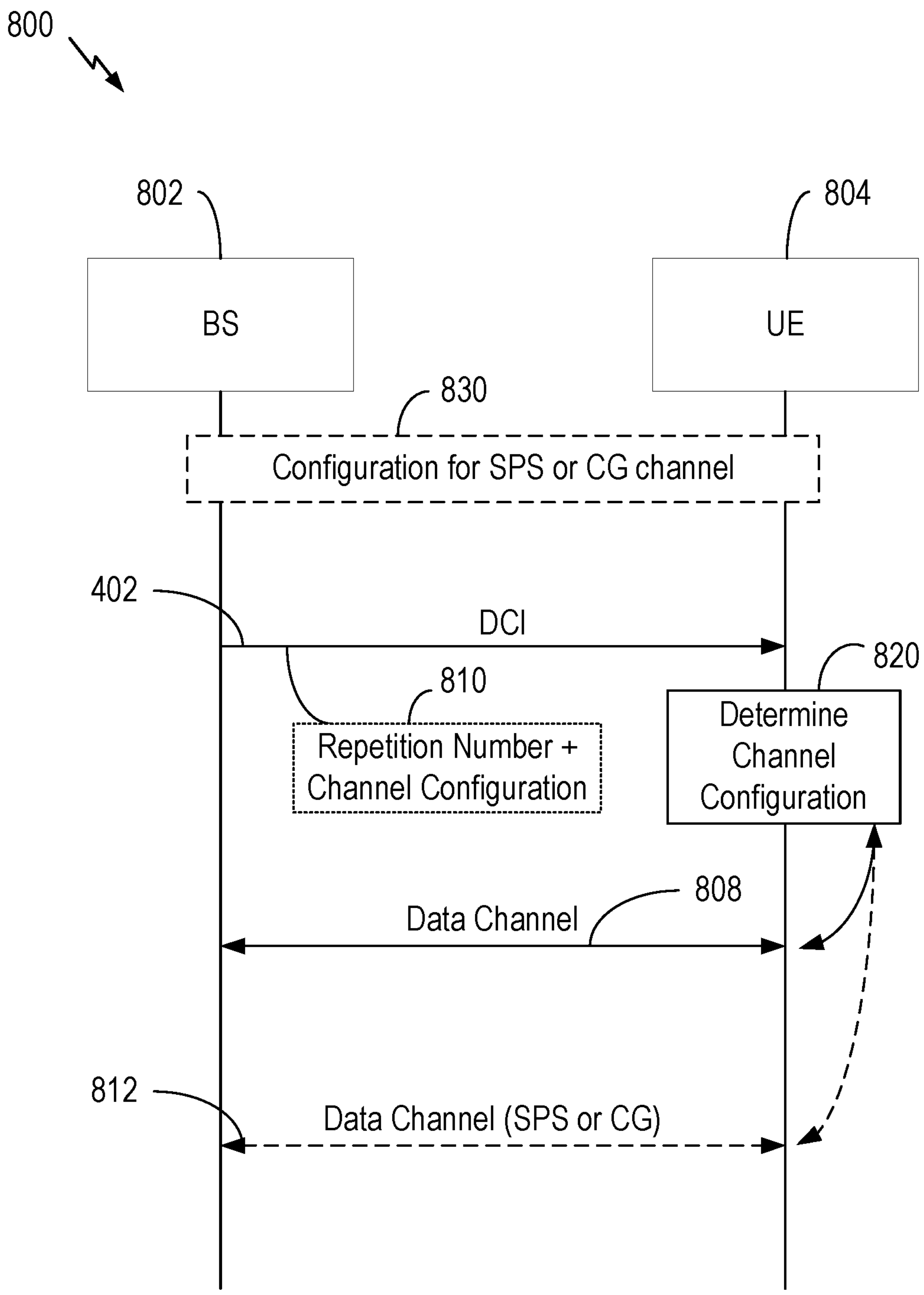
FIG. 8 is a call flow diagram illustrating example operations for configuring a transmission on a channel.

The other data channel may be configured using one of SPS or a CG, as described in more detail herein with respect to FIG. 8. For example, the determination may be further based on a configuration associated with the SPS or the CG. In other words, the configuration of the other data channel using SPS or CG may also indicate (e.g., implicitly) whether the dynamic indication of the channel configuration applies to the SPS or CG data channel.

FIG. 8 is a call flow diagram illustrating example operations 800 for configuring a transmission on a channel.

As illustrated, BS 802 may dynamically indicate to UE 804 whether a PUSCH (or PDSCH) transmission over multiple slots (or multiple segments) is done using multiple TBs (e.g., repetitions of a TB, with possibly different RVs), one on each slot (or segment), or using one TB over multiple slots (or segments). In some aspects, the indication of the channel configuration may be per instance or semi-persistent. In other words, a DCI may be used to indicate the channel configuration for each PUSCH (or PDSCH) transmission, or the channel configuration may be applied for multiple PUSCH (or PDSCH) transmissions (e.g., that are configured using SPS or CG).

In some examples, the dynamic indication may be included in the DCI 402 that schedules a data channel 808. In some aspects, the DCI 402 (e.g., corresponding to DCI 402 of FIG. 4A or 4B) may be group-common DCI. A group-common DCI generally refers to a DCI that is used to indicate control information to a group of UEs. The data channel 808 may be a PUSCH transmitted by the UE 804 and received by the BS 802, or may be a PDSCH transmitted by the BS 802 and received by the UE 804.

In some aspects, the dynamic indication may be combined with a bitfield 810 that indicates the repetition number K. For example, one or more bits may be added to the field 810, or the same bitfield 810 may be used but with a different interpretation (e.g., based on configuration) such that the bitfield 810 can indicate channel configuration. For example, a certain code or bit pattern for the bitfield 810 may indicate a certain repetition number as well as the channel configuration.

In some cases, the channel configuration may be applied for both PUSCH repetition type A and type B. For PUSCH repetition type B, the dynamic indication may indicate either single-TB transmission or multiple-TB repetition over multiple segments. In some cases, for PUSCH repetition type B repetition, the dynamic indication may indicate single-TB transmission or multiple-TB repetition over multiple slots. Similar repetition types may be implemented for PDSCH.

The dynamic indication may also be applicable for PUSCH with a configured grant (CG). For example, the PUSCH may be configured using a CG at block 830. Dynamic indication of single-TB transmission or multiple-TB repetition over multiple slots (or segments) for a dynamic-grant (DG) PUSCH (e.g., scheduled via DCI 402) may implicitly be applied for one or multiple configured grant PUSCHs. For example, the data channel 808 may be a PUSCH that is scheduled using a configured grant. The determined channel configuration at block 820 may be applied for the data channel 812 (e.g., implicitly configured). In some aspects, applicability of the channel configuration for the configured grant PUSCH may be based on the configuration of the configured grant. For example, the configuration of the configured grant may also indicate whether the dynamically indicated channel configuration is to be applied for the CG scheduled data channel.

The dynamic indication may also be applicable for SPS downlink data transmission. For example, PDSCH may be configured using SPS at block 830. In other words, the dynamic indication of single-TB transmission or multiple-TB repetition over multiple slots for a scheduled PDSCH may implicitly be applied for one or multiple SPSs. For example, the data channel 812 may be a PDSCH that is scheduled using SPS (e.g., at block 830). The determined channel configuration at block 820 may be applied for the data channel 812 (e.g., PDSCH scheduled using SPS). In some aspects, applicability of the channel configuration to the SPS PUSCH may be based on the configuration of the SPS. For example, the configuration of the SPS data channel may also indicate whether the dynamically indicated channel configuration is to be applied for the data channel scheduled using SPS.

Example Wireless Communication Devices

Figure 9:
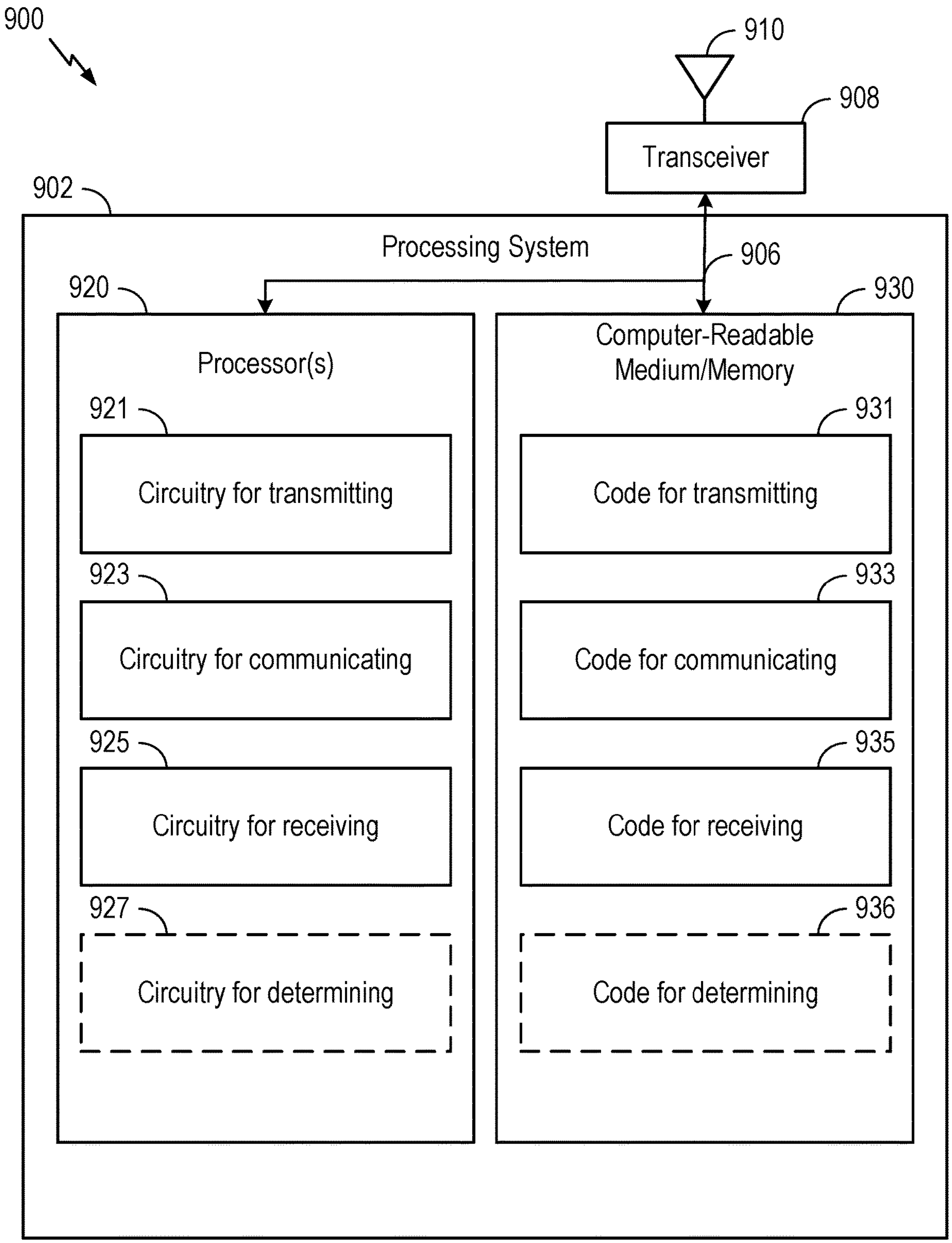
FIGS. 9 and 10 depict example communications devices that includes various components operable, configured, or adapted to perform operations for the techniques disclosed herein.

FIG. 9 depicts an example communications device 900 that includes various components operable, configured, or adapted to perform operations for the techniques disclosed herein, such as the operations depicted and described with respect to FIGS. 6 and 8. In some examples, communication device 900 may be a base station 102 as described, for example with respect to FIGS. 1 and 2.

Communications device 900 includes a processing system 902 coupled to a transceiver 908 (e.g., a transmitter and/or a receiver). Transceiver 908 is configured to transmit (or send) and receive signals for the communications device 900 via an antenna 910, such as the various signals as described herein. Processing system 902 may be configured to perform processing functions for communications device 900, including processing signals received and/or to be transmitted by communications device 900.

Processing system 902 includes one or more processors 920 coupled to a computer-readable medium/memory 930 via a bus 906. In certain aspects, computer-readable medium/memory 930 is configured to store instructions (e.g., computer-executable code) that when executed by the one or more processors 920, cause the one or more processors 920 to perform the operations illustrated in FIGS. 6 and 8, or other operations for performing the various techniques discussed herein for channel configuration.

In the depicted example, computer-readable medium/memory 930 stores code 931 for transmitting and code 933 for communicating. The computer-readable medium/memory 930 may also include code 935 for receiving; and optionally code 936 for determining.

In the depicted example, the one or more processors 920 include circuitry configured to implement the code stored in the computer-readable medium/memory 930, including circuitry 921 for transmitting and circuitry 923 for communicating. The one or more processors 920 may also include circuitry 925 for receiving; and optionally circuitry 927 for determining.

Various components of communications device 900 may provide means for performing the methods described herein, including with respect to FIGS. 6 and 8.

In some examples, means for transmitting or sending (or means for outputting for transmission) may include the transceivers 232 and/or antenna(s) 234 of the base station 102 illustrated in FIG. 2 and/or transceiver 908 and antenna 910 of the communication device 900 in FIG. 9.

In some examples, means for receiving (or means for obtaining) may include the transceivers 232 and/or antenna (s) 234 of the base station illustrated in FIG. 2 and/or transceiver 908 and antenna 910 of the communication device 900 in FIG. 9.

In some examples, means for transmitting, communicating, receiving, and determining may include various processing system components, such as: the one or more processors 920 in FIG. 9, or aspects of the base station 102 depicted in FIG. 2, including receive processor 238, transmit processor 220, TX MIMO processor 230, and/or controller/processor 240 (including channel configuration component 241).

Notably, FIG. 9 is just use example, and many other examples and configurations of communication device 900 are possible.

Figure 10:
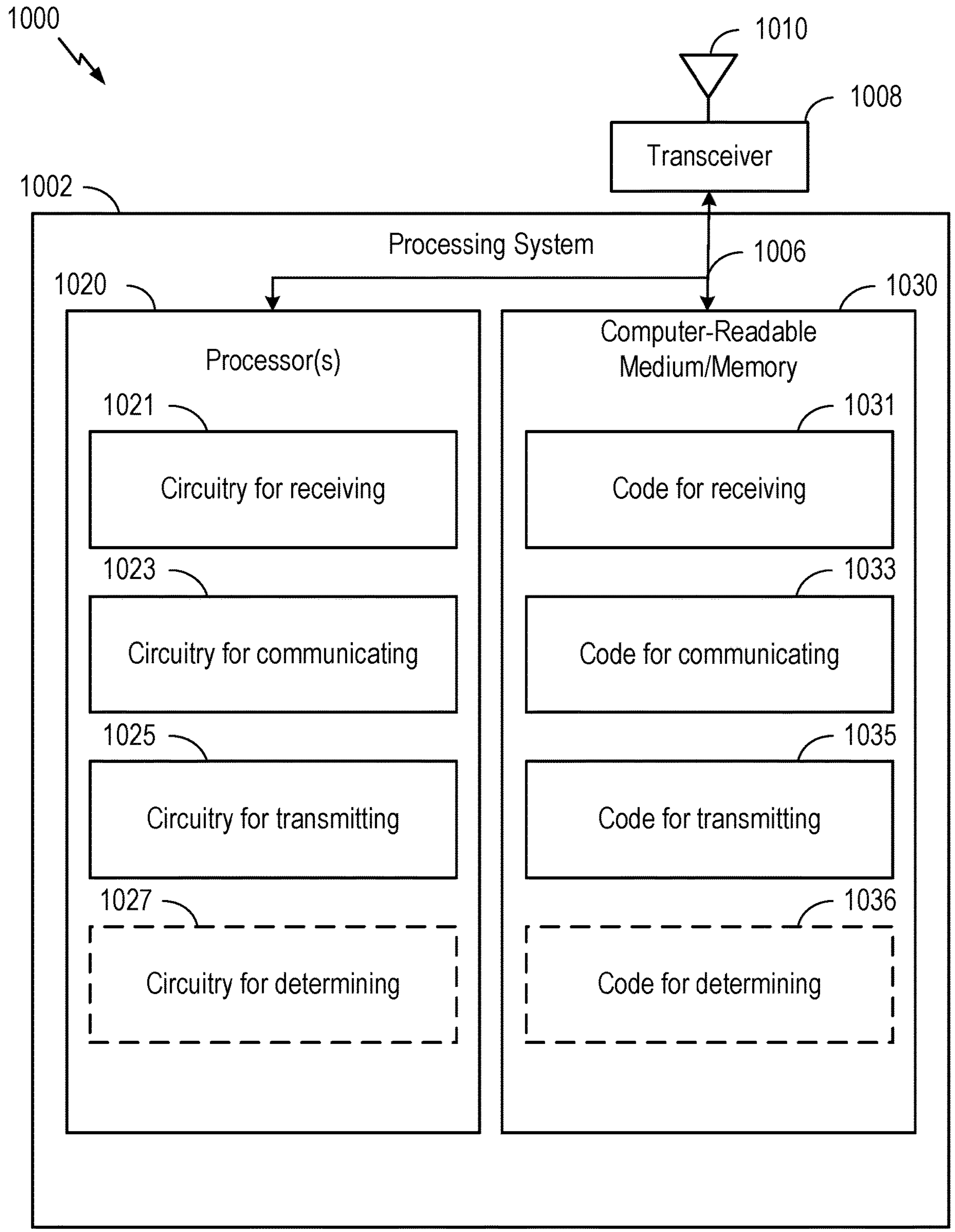

FIG. 10 depicts an example communications device 1000 that includes various components operable, configured, or adapted to perform operations for the techniques disclosed herein, such as the operations depicted and described with respect to FIGS. 7-8. In some examples, communication device 1000 may be a user equipment 104 as described, for example with respect to FIGS. 1 and 2.

Communications device 1000 includes a processing system 1002 coupled to a transceiver 1008 (e.g., a transmitter and/or a receiver). Transceiver 1008 is configured to transmit (or send) and receive signals for the communications device 1000 via an antenna 1010, such as the various signals as described herein. Processing system 1002 may be configured to perform processing functions for communications device 1000, including processing signals received and/or to be transmitted by communications device 1000.

Processing system 1002 includes one or more processors 1020 coupled to a computer-readable medium/memory 1030 via a bus 1006. In certain aspects, computer-readable medium/memory 1030 is configured to store instructions (e.g., computer-executable code) that when executed by the one or more processors 1020, cause the one or more processors 1020 to perform the operations illustrated in FIG. 7, or other operations for performing the various techniques discussed herein for channel configuration.

In the depicted example, computer-readable medium/memory 1030 stores code 1031 for receiving; and code 1033 for communicating. The computer-readable medium/memory 1030 may also include code 1035 for transmitting; and optionally code 1036 for determining.

In the depicted example, the one or more processors 1020 include circuitry configured to implement the code stored in the computer-readable medium/memory 1030, including circuitry 1021 for receiving; and circuitry 1023 for communicating. The one or more processors 1020 may also include circuitry 1025 for transmitting; and optionally circuitry 1027 for determining.

Various components of communications device 1000 may provide means for performing the methods described herein, including with respect to FIG. 7.

In some examples, means for transmitting or sending (or means for outputting for transmission) may include the transceivers 254 and/or antenna(s) 252 of the user equipment 104 illustrated in FIG. 2 and/or transceiver 1008 and antenna 1010 of the communication device 1000 in FIG. 10.

In some examples, means for receiving (or means for obtaining) may include the transceivers 254 and/or antenna (s) 252 of the user equipment 104 illustrated in FIG. 2 and/or transceiver 1008 and antenna 1010 of the communication device 1000 in FIG. 10.

In some examples, means for receiving may include various processing system components, such as: the one or more processors 1020 in FIG. 10, or aspects of the user equipment 104 depicted in FIG. 2, including receive processor 258, transmit processor 264, TX MIMO processor 266, and/or controller/processor 280 (including channel configuration component 281).

Notably, FIG. 10 is just use example, and many other examples and configurations of communication device 1000 are possible.

EXAMPLE CLAUSES

Implementation examples are described in the following numbered clauses:

Clause 1. A method for wireless communication by a user-equipment (UE), comprising: receiving an indication of a channel configuration indicating whether transmission of a data channel uses a transport block (TB) on multiple segments of a data unit or the data channel is to be repeated on multiple TBs with each TB of the multiple TBs being on a respective one of the multiple segments; and communicating the data channel in accordance with the indication.

Clause 2. The method of Clause 1, wherein the received indication of the channel configuration indicates transmission of the data channel using the transport block (TB) on the multiple segments of the data unit.

Clause 3. The method of any one of Clauses 1-2, wherein the received indication of the channel configuration indicates the data channel is to be repeated on the multiple TBs with each TB of the multiple TBs being on the respective one of the multiple segments.

Clause 4. The method of any one of Clauses 1-3, wherein each of the multiple segments is in a different slot.

Clause 5. The method of any one of Clauses 1-4, wherein the multiple segments include non-contiguous segments.

Clause 6. The method of any one of Clauses 1-5, wherein the multiple segments include contiguous segments.

Clause 7. The method of Clause 6, wherein the contiguous segments span across a slot boundary between adjacent slots.

Clause 8. The method of any one of Clauses 1, wherein each segment of the multiple segments comprises a group of consecutive downlink configured symbols or a group of consecutive uplink configured symbols.

Clause 9. The method of any one of Clauses 1-8, wherein communicating the data channel comprises: transmitting the data channel if the data channel is a physical uplink shared channel (PUSCH); or receiving the data channel if the data channel is a physical downlink shared channel (PDSCH).

Clause 10. The method of any one of Clauses 1-9, wherein the indication of the channel configuration is part of a downlink control information (DCI) that schedules the data channel.

Clause 11. The method of claim 10, wherein: the DCI comprises a field configured to indicate a number of repetitions associated with the transmission of the data channel, and the field also includes the indication of the channel configuration.

Clause 12. The method of any one of Clauses 10-11, wherein the DCI comprises a group-common DCI.

Clause 13. The method of any one of Clauses 1-12, further comprising: determining, based on the indication of the channel configuration, whether transmission of another data channel uses another TB on multiple segments of another data unit or the other data channel is to be repeated on multiple other TBs with each TB of the multiple other TBs being on a respective one of the multiple segments of the other data unit; and communicating the other data channel in accordance with the determination.

Clause 14. The method of Clause 13, wherein the other data channel is configured using one of semi-persistent scheduling (SPS) or a configured grant (CG).

Clause 15. The method of Clause 14, wherein the determination is further based on a configuration associated with the SPS or the CG.

Clause 16. A method for wireless communication by a base station (BS), comprising: transmitting an indication of a channel configuration indicating whether transmission of a data channel uses a transport block (TB) on multiple segments of a data unit or the data channel is to be repeated on multiple TBs with each TB of the multiple TBs being on a respective one of the multiple segments; and communicating the data channel in accordance with the indication.

Clause 17. The method of Clause 16, wherein the received indication of the channel configuration indicates transmission of the data channel using the transport block (TB) on the multiple segments of the data unit.

Clause 18. The method of any one of Clauses 16-17, wherein the received indication of the channel configuration indicates the data channel is to be repeated on the multiple TBs with each TB of the multiple TBs being on the respective one of the multiple segments.

Clause 19. The method of any one of Clauses 16-18, wherein each of the multiple segments is in a different slot.

Clause 20. The method of any one of Clauses 16-19, wherein the multiple segments include non-contiguous segments.

Clause 21. The method of any one of Clauses 16-20, wherein the multiple segments include contiguous segments.

Clause 22. The method of Clause 21, wherein the contiguous segments span across a slot boundary between adjacent slots.

Clause 23. The method of any one of Clauses 16-22, wherein each segment of the multiple segments comprises one of a group of consecutive downlink configured symbols or a group of consecutive uplink configured symbols.

Clause 24. The method of any one of Clauses 16-23, wherein communicating the data channel comprises: receiving the data channel if the data channel is a physical uplink shared channel (PUSCH); or transmitting the data channel if the data channel is a physical downlink shared channel (PDSCH).

Clause 25. The method of any one of Clauses 16-24, wherein the indication of the channel configuration is part of a downlink control information (DCI) that schedules the data channel.

Clause 26. The method of Clause 25, wherein: the DCI comprises a field configured to indicate a number of repetitions associated with the transmission of the data channel, and the field also includes the indication of the channel configuration.

Clause 27. The method of any one of Clauses 25-26, wherein the DCI comprises a group-common DCI.

Clause 28. The method of any one of Clauses 16-27, further comprising: determining, in accordance with the indication of the channel configuration, whether transmission of another data channel uses another TB on multiple segments of another data unit or the other data channel is to be repeated on multiple other TBs with each TB of the multiple other TBs being on a respective one of the multiple segments of the other data unit; and communicating the other data channel in accordance with the determination.

Clause 29. The method of Clause 28, wherein the other data channel is configured using one of semi-persistent scheduling (SPS) or a configured grant (CG).

Clause 30. The method of Clause 29, wherein the determination is further based on a configuration associated with the SPS or the CG.

Clause 31: An apparatus, comprising: a memory comprising executable instructions; one or more processors configured to execute the executable instructions and cause the apparatus to perform a method in accordance with any one of Clauses 1-30.

Clause 32: An apparatus, comprising means for performing a method in accordance with any one of Clauses 1-30.

Clause 33: A non-transitory computer-readable medium comprising executable instructions that, when executed by one or more processors of an apparatus, cause the apparatus to perform a method in accordance with any one of Clauses 1-30.

Clause 34: A computer program product embodied on a computer-readable storage medium comprising code for performing a method in accordance with any one of Clauses 1-30.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232*a*-232*t*. Each modulator in transceivers 232*a*-232*t* may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232*a*-232*t* may be transmitted via the antennas 234*a*-234*t*, respectively.

At UE 104, antennas 252*a*-252*r* may receive the downlink signals from the BS 102 and may provide received signals to the demodulators (DEMODs) in transceivers 254*a*-254*r*, respectively. Each demodulator in transceivers 254*a*-254*r* may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254*a*-254*r*, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254*a*-254*r* (e.g., for SC-FDM), and transmitted to BS 102.

At BS 102, the uplink signals from UE 104 may be received by antennas 234*a-t*, processed by the demodulators in transceivers 232*a*-232*t*, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^{\mu}\times15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of channel transmission in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication by a user-equipment (UE), comprising:
  - one or more memories; and
  - one or more processors coupled to the one or more memories and configured to cause the UE to:
    - receive an indication from a base station (BS) to switch to a first channel configuration of multiple channel configurations to support a first code rate from a second channel configuration of the multiple channel configurations supporting a second code rate that is different from the first code rate, wherein one of the first and second channel configurations indicates transmission of a data channel uses a transport block (TB) on multiple segments of a data unit and another of the first and second channel configurations indicates that the data channel is to be repeated on multiple TBs with each TB of the multiple TBs being on a respective one of the multiple segments, wherein the indication is part of a downlink control information (DCI) that schedules the data channel, the DCI comprising a field that indicates both a number of repetitions associated with the transmission of the data channel and a selection of the first channel configuration or the second channel configuration for the transmission of the data channel, wherein the field comprises a time domain resource allocation (TDRA) bitfield, the TDRA bitfield indicating the number of repetitions and the selection of the first channel configuration or the second channel configuration; and
    - communicate the data channel in accordance with the indication.

2. The apparatus of claim 1, wherein the selection is applicable for both repetition type A and repetition type B of the data channel, and wherein for the repetition type B, the selection indicates a single TB transmission over the multiple segments or multiple TBs repetition over the multiple segments.

3. The apparatus of claim 1, wherein the indication of the second channel configuration indicates the data channel is to be repeated on the multiple TBs with each TB of the multiple TBs being on a respective one of the multiple segments, and wherein each repetition of the data channel comprises different encoding of data carried via the data channel.

4. The apparatus of claim 1, wherein each of the multiple segments is in a different slot.

5. The apparatus of claim 1, wherein the multiple segments include non-contiguous segments.

6. The apparatus of claim 1, wherein the multiple segments include contiguous segments.

7. The apparatus of claim 6, wherein the contiguous segments span across a slot boundary between adjacent slots.

8. The apparatus of claim 1, wherein each segment of the multiple segments comprises a group of consecutive downlink configured symbols or a group of consecutive uplink configured symbols.

9. The apparatus of claim 1, wherein the one or more processors are further configured to cause the UE to:
  - transmit the data channel if the data channel is a physical uplink shared channel (PUSCH); or
  - receive the data channel if the data channel is a physical downlink shared channel (PDSCH).

10. The apparatus of claim 1, wherein the indication of the first channel configuration is part of the DCI that schedules the data channel.

11. The apparatus of claim 10, wherein:
  - the DCI comprises a field configured to indicate a number of repetitions associated with the transmission of the data channel, and
  - the field also includes the indication of the first channel configuration.

12. The apparatus of claim 10, wherein the DCI comprises a group-common DCI that provides the selection of the first channel configuration or the second channel configuration to a group of UEs, and wherein the selection is applied for multiple transmissions of the data channel configured using semi-persistent scheduling (SPS) or a configured grant (CG).

13. The apparatus of claim 1, wherein the one or more processors are further configured to cause the UE to:
  - determine, based on the indication of the first channel configuration, whether transmission of at least one other data channel uses another TB on multiple segments of at least one other data unit or the other data channel is to be repeated on multiple other TBs with each TB of the multiple other TBs being on a respective one of the multiple segments of the other data unit; and
  - communicate the other data channel in accordance with the determination.

14. The apparatus of claim 13, wherein the other data channel is configured using one of semi-persistent scheduling (SPS) or a configured grant (CG), and wherein the determination is further based on a configuration associated with the SPS or the CG.

15. An apparatus for wireless communication by a base station (BS), comprising:
  - one or more memories; and
  - one or more processors coupled to the one or more memories and configured to cause the BS to:
    - transmit an indication to a user equipment (UE) to switch to a first channel configuration of multiple channel configurations to support a first code rate from a second channel configuration of the multiple channel configurations supporting a second code rate that is different from the first code rate, wherein one of the first and second channel configurations indicates transmission of a data channel uses a transport block (TB) on multiple segments of a data unit and another of the first and second channel configurations indicates that the data channel is to be repeated on multiple TBs with each TB of the multiple TBs being on a respective one of the multiple segments, wherein the indication is part of a downlink control information (DCI) that schedules the data channel, the DCI comprising a field that indicates both a number of repetitions associated with the transmission of the data channel and a selection of the first channel configuration or the second channel configuration for the transmission of the data channel, wherein the field comprises a time domain resource allocation (TDRA) bitfield, the TDRA bitfield indicating the number of repetitions and the selection of the first channel configuration or the second channel configuration; and communicate the data channel in accordance with the indication.

16. The apparatus of claim 15, wherein the indication of the first channel configuration indicates transmission of the data channel using the TB on the multiple segments of the data unit.

17. The apparatus of claim 15, wherein the indication of the second channel configuration indicates the data channel is to be repeated on the multiple TBs with each TB of the multiple TBs being on a respective one of the multiple segments, and wherein each repetition of the data channel comprises different encoding of data carried via the data channel.

18. The apparatus of claim 15, wherein each of the multiple segments is in a different slot.

19. The apparatus of claim 15, wherein the multiple segments include non-contiguous segments.

20. The apparatus of claim 15, wherein the multiple segments include contiguous segments.

21. The apparatus of claim 20, wherein the contiguous segments span across a slot boundary between adjacent slots.

22. The apparatus of claim 15, wherein each segment of the multiple segments comprises one of a group of consecutive downlink configured symbols or a group of consecutive uplink configured symbols.

23. The apparatus of claim 15, wherein the one or more processors are further configured to cause the BS to:

receive the data channel if the data channel is a physical uplink shared channel (PUSCH); or transmit the data channel if the data channel is a physical downlink shared channel (PDSCH).

24. The apparatus of claim 15, wherein the indication of the first channel configuration is part of the DCI that schedules the data channel.

25. The apparatus of claim 24, wherein:

the DCI comprises a field configured to indicate a number of repetitions associated with the transmission of the data channel, and the field also includes the indication of the first channel configuration.

26. The apparatus of claim 24, wherein the DCI comprises a group-common DCI.

27. The apparatus of claim 15, wherein the one or more processors are further configured to cause the BS to:

determine, in accordance with the indication of the first channel configuration, whether transmission of another data channel uses another TB on multiple segments of another data unit or the other data channel is to be repeated on multiple other TBs with each TB of the multiple other TBs being on a respective one of the multiple segments of the other data unit; and communicate the other data channel in accordance with the determination.

28. The apparatus of claim 27, wherein the other data channel is configured using one of semi-persistent scheduling (SPS) or a configured grant (CG), and wherein the determination is further based on a configuration associated with the SPS or the CG.

29. A method for wireless communications at a user equipment (UE), comprising:

receiving an indication from a base station (BS) to switch to a first channel configuration of multiple channel configurations to support a first code rate from a second channel configuration of the multiple channel configurations supporting a second code rate that is different from the first code rate, wherein one of the first and second channel configurations indicates transmission of a data channel uses a transport block (TB) on multiple segments of a data unit and another of the first and second channel configurations indicates that the data channel is to be repeated on multiple TBs with each TB of the multiple TBs being on a respective one of the multiple segments, wherein the indication is part of a downlink control information (DCI) that schedules the data channel, the DCI comprising a field that indicates both a number of repetitions associated with the transmission of the data channel and a selection of the first channel configuration or the second channel configuration for the transmission of the data channel, wherein the field comprises a time domain resource allocation (TDRA) bitfield, the TDRA bitfield indicating the number of repetitions and the selection of the first channel configuration or the second channel configuration; and communicating the data channel in accordance with the indication.

30. A method for wireless communication by a base station (BS), comprising:

transmitting an indication to a user equipment (UE) to switch to a first channel configuration of multiple channel configurations to support a first code rate from a second channel configuration of the multiple channel configurations supporting a second code rate that is different from the first code rate, wherein one of the first and second channel configurations indicates transmission of a data channel uses a transport block (TB) on multiple segments of a data unit and another of the first and second channel configurations indicates that the data channel is to be repeated on multiple TBs with each TB of the multiple TBs being on a respective one of the multiple segments, wherein the indication is part of a downlink control information (DCI) that schedules the data channel, the DCI comprising a field that indicates both a number of repetitions associated with the transmission of the data channel and a selection of the first channel configuration or the second channel configuration for the transmission of the data channel, wherein the field comprises a time domain resource allocation (TDRA) bitfield, the TDRA bitfield indicating the number of repetitions and the selection of the first channel configuration or the second channel configuration; and communicating the data channel in accordance with the indication.

* * * * *